H. A. HALL.
PORTABLE WATER FILTER.
No. 32,361. Patented May 21, 1861.
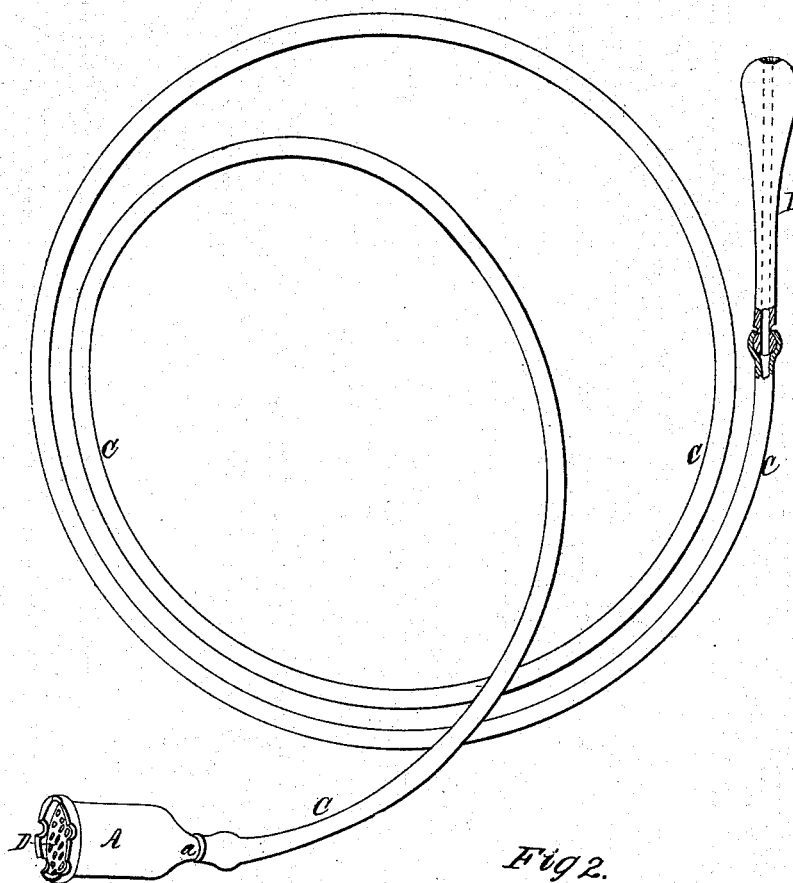
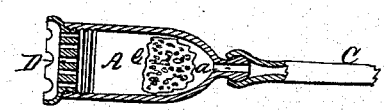

UNITED STATES PATENT OFFICE.

HENRY A. HALL, OF BOSTON, MASSACHUSETTS.

PORTABLE FILTER.

Specification of Letters Patent No. 32,361, dated May 21, 1861.

*To all whom it may concern:*

Be it known that I, HENRY A. HALL, of Boston, in the county of Suffolk and State of Massachusetts, have invented a new and useful Portable Filter; and I do hereby declare that the following is a full, clear, and exact description thereof, reference being had to the accompanying drawings, making a part of this specification, in which—

Figure 1, shows the improved portable filter complete. Fig. 2, is a diametrical section through the filtering tube.

Similar letters of reference indicate corresponding parts in both figures.

This invention is an improved portable filter intended to be carried in the pocket, or other convenient place and to be used more especially by travelers for drinking from low springs and other such places, without roiling the water.

The nature of my invention consists in a small tube of hard rubber having a neck formed on one end, and a perforated screw cap on the other end for containing some suitable filtering substance, in combination with a flexible rubber tube and a rubber mouth piece, all as will be hereinafter fully explained.

To enable those skilled in the art to make and use my invention, I will proceed to describe its construction and operation.

A, is a short tube of small diameter made of hard vulcanized rubber. One end of this tube is tapered off so as to form a small neck and head *a*, Fig. 1, with a hole through it communicating with the bore of the tube. The opposite, or large end of this tube A, has a female screw thread cut on its inside surface for receiving the screw cap B, which cap is perforated with a great number of small holes to prevent insects, etc., which might be in the water from being drawn into the tube A, or into the mouth. In this tube A, a small piece of fine sponge *e*, is introduced which will serve a very good purpose as a filter, or any other suitable filtering substance may be used in the tube A, which substance may be taken out, by unscrewing the cap B, and, from time to time, cleaned.

C, is a small rubber tube which is very flexible and quite long, one end of this tube is stretched over the neck *a*, of tube A, and the head on this neck will keep the tube C, tightly on the neck. To the other end of this flexible tube C, a tubular mouth piece D, is attached in the same manner as tube A, is attached to tube C.

Now from the foregoing description it will be seen that I have constructed a portable, or pocket filter of india-rubber, dispensing entirely with metal; the filters being constructed of this material, they are easily and cheaply made and put together, can be sold at a comparative small cost, and will wear for a very long time, as they will not corrode, and when clogged up with particles of extreneous substances they can be easily taken apart, cleaned, and put together again.

I am aware that filtering substances attached to the end of a flexible tube have been used to form a portable filter, but such filters are compartively expensive and will soon become clogged up with foreign substances and rendered useless. Therefore I do not claim a portable filter constructed in this way; but,

Having thus described my invention, I claim as a new and improved article of manufacture, and desire to secure by Letters Patent,

A portable filter constructed of an india-rubber tube A, perforated cap B, neck *a*, flexible tube C, and mouth piece D, as herein described and shown.

HENRY A. HALL.

Witnesses:
CHARLES M. CLAPP,
S. E. HAWES.